United States Patent
Golin

(10) Patent No.: US 6,674,797 B1
(45) Date of Patent: Jan. 6, 2004

(54) ENSURING VIDEO BUFFER VERIFER INTEGRITY IN MPEG-LIKE ENCODING

(75) Inventor: Stuart Jay Golin, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/539,059

(22) Filed: Mar. 30, 2000

(51) Int. Cl.[7] .................................................. H04N 7/12
(52) U.S. Cl. .............................. 375/240.01; 375/240.06
(58) Field of Search ......................... 375/240.01, 290.06

(56) References Cited

U.S. PATENT DOCUMENTS

| | | | |
|---|---|---|---|
| 5,686,963 A | * 11/1997 | Uz et al. | ............... 375/240.06 |
| 5,847,761 A | 12/1998 | Uz et al. | |
| 5,861,919 A | 1/1999 | Perkins et al. | |
| 5,878,166 A | 3/1999 | Legall | |

OTHER PUBLICATIONS

M. Perkins et al., "Statistical Multiplexing of Multiple MPEG-2 Video Programs in a Single Channel", *SMPTE Journal*, pp. 596–599, Sep. 1995.

* cited by examiner

Primary Examiner—Chris Kelley
Assistant Examiner—Allen Wong

(57) ABSTRACT

Ensuring integrity of a video buffer verifier (VBV) employed in MPEG-like video encoders is realized by controllably adjusting the bits being drained from a video encoder buffer (eBuff). The number of bits being drained from eBuff is adjusted through feedback to minimize the difference in the bit content of a buffer (mBuff) maintained in a bit-rate controller in the video encoder that models the buffer of a hypothetical decoder, and the bit content of that hypothetical buffer (vBuff). Specifically, this is realized by controllably inhibiting transmission of bits from eBuff during intervals that the value of a prescribed relationship is greater than a predetermined value. In one example, the prescribed relationship is dependent on an instantaneous video encoding rate, an end-to-end delay, the bit content of mBuff and the bit content of eBuff.

10 Claims, 1 Drawing Sheet

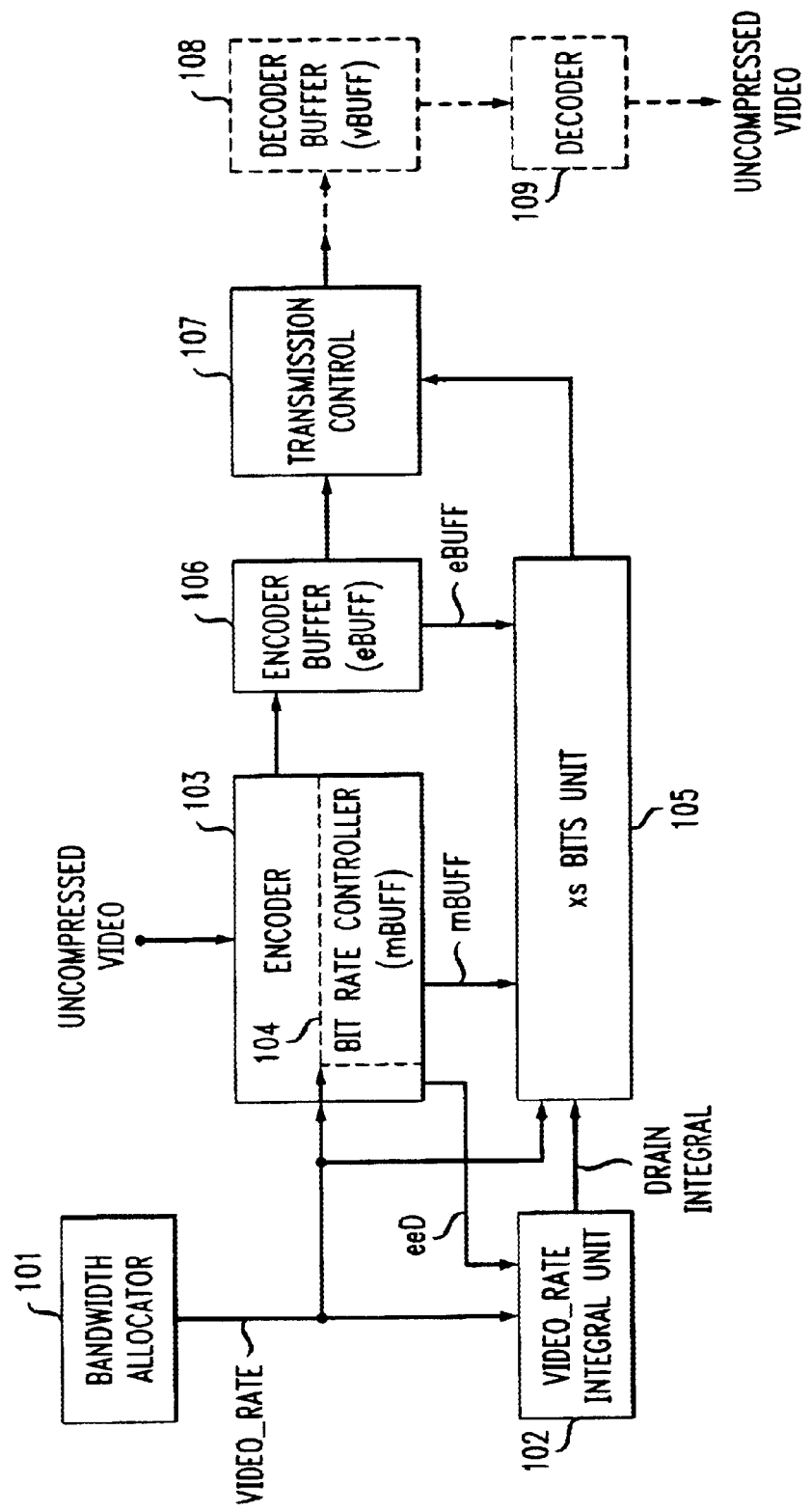

ENSURING VIDEO BUFFER VERIFER INTEGRITY IN MPEG-LIKE ENCODING

TECHNICAL FIELD

This invention relates to video encoding and, more particularly, to ensuring integrity of the buffer of a video buffer verifier in an MPEG-like video encoder.

BACKGROUND OF THE INVENTION

The Moving Picture Experts Group (MPEG) has the concept of a Video Buffer Verifier, or VBV, which is a hypothetical decoder conceptually connected to the output of an encoder. When it is time for the VBV to decode a picture, it instantaneously removes it from its buffer, the VBV buffer. This VBV buffer must never overflow or underflow in normal operation. If it overflows, data is lost. If it underflows, video data is not present when needed to decode a picture.

A Bit-Rate Controller (BRC) function of a corresponding encoder is responsible for ensuring integrity of the VBV buffer. The BRC cannot do this directly, since it lacks direct access to the VBV buffer; instead it monitors the fullness of mBuff, its model of the VBV buffer.

For this reason, the overall encoding system is responsible for ensuring that mBuff correctly represents the VBV buffer. Any number of factors can cause these buffers to differ, and such differences can accumulate, causing the VBV buffer to overflow or underflow.

U.S. Pat. No. 5,847,761, issued on Dec. 8, 1998, discloses an algorithm to ensure the validity of mBuff. The disclosed arrangement adjusts the number of bits in mBuff when it differs from the VBV buffer. Indeed, in order to effect such a scheme, the system needs direct control of mBuff. Consequently, this approach cannot be used if the system is unable to adjust the number of bits in the mBuff.

SUMMARY OF THE INVENTION

Problems regarding ensuring integrity of a video buffer verifier (VBV) employed in MPEG-like video encoders are addressed by controllably adjusting the bits being drained from a video encoder buffer (eBuff). The number of bits being drained from eBuff is adjusted through feedback to minimize the difference in the bit content of a buffer (mBuff) maintained in a bit-rate controller in the video encoder that models the buffer of a hypothetical decoder, and the bit content of that hypothetical buffer (vBuff).

Specifically, this is realized by controllably inhibiting transmission of bits from eBuff during intervals that the value of a prescribed relationship is greater than a predetermined value. In one example, the prescribed relationship is dependent on an instantaneous video encoding rate, an end-to-end delay, the bit content of mBuff and the bit content of eBuff.

In one embodiment of the invention, a constant video encoding rate is utilized in conjunction with a first prescribed relationship to control the bits being drained from eBuff.

In another embodiment of the invention, a variable video encoding rate is utilized in conjunction with a second prescribed relationship to control the bits being drained from eBuff.

BRIEF DESCRIPTION OF THE DRAWING

FIG. 1 shows, in simplified block diagram form, an MPEG-like encoder including one embodiment of the invention.

DETAILED DESCRIPTION

A. Theoretical Discussion

In an MPEG-like encoder there are three buffers of interest, namely:

(1) vBuff, the VBV buffer, as deduced from the bit stream. Also referred to as the decoder's buffer;

(2) mBuff, the encoder's model of the VBV buffer; and (3) eBuff, the encoder's buffer.

These symbols will represent not only the buffers, but also the number of bits they contain at any given time. The meaning will be clear from the context of the description below.

A bit rate controller, BRC, is an encoder function that models vBuff to ensure its integrity. The BRC tries to adjust the quantization so that mBuff, its model of vBuff, is never in danger of overflow or underflow. If mBuff is about to overflow, the BRC can reduce the effective video coding rate by stuffing zero-bytes before start codes; if mBuff is about to underflow, the BRC goes into "panic" mode, and stops generating bits. Assuming that the BRC is functioning properly, integrity of vBuff then depends on mBuff being an accurate model of vBuff, namely:

$$mBuff = vBuff. \quad (1)$$

At constant video-rate coding the contents of eBuff and vBuff are related by:

$$eBuff[n] + vBuff[n] = vSize \quad (2)$$

where eBuff[n] is the number of bits in the encoder's buffer just after the nth picture is encoded, and where vBuff[n] is the number of bits in the decoder's buffer just after the nth picture is decoded. Also, vSize is the size of the VBV buffer, i.e., the maximum number of bits it can hold.

Note, there is a delay between the encoding and decoding of picture n, known as the end-to-end-buffer-delay, eeD. This delay must be constant for the frame rate to be constant. It is given by:

$$eeD = vSize/video\_rate \quad (3)$$

where video_rate is the video coding rate. Thus, for example, eBuff[n] and vBuff[n] in Equation (2) refer to the same picture, but at times differing by eeD.

In general, the total bit rate will exceed the video coding rate. Any difference beyond that needed for audio and data is slack. Some slack is needed for control, but it should be minimal. It is noted that any unused slack can be compensated for with the insertion of an appropriate number of null packets, if necessary.

The rate at which bits are drained from the encoder's buffer, the drain_rate, should equal video_rate. Metering refers to the mechanism that adjusts the instantaneous drain-rate to satisfy this requirement. Because exact equality can be difficult, at best, to achieve, and because bits may be added to or removed from the bitstream without knowledge of the BRC, metering is insufficient. Feedback is necessary to minimize metering errors from accumulating. Equation (1) is used as the basis for feedback; i.e., the drain_rate is adjusted to minimize the difference between mBuff and vBuff, where mBuff is reported by the BRC, and we estimate vBuff. This is the key to buffer control. It should be understood that the "feedback" results from controlling the bits being drained from eBuff, thereby controlling the video transmission rate, such that Equation (1) is met.

Since vBuff cannot be measured directly, Equation (2) is used to eliminate it from Equation (1), namely:

$$e\text{Buff}[n]+m\text{Buff}[n]=v\text{Size}. \qquad (4)$$

As both eBuff and mBuff are known at the completion of every picture, it is straightforward to satisfy Equation (4). If eBuff is too low (i.e., if eBuff<vSize—mBuff), we stop draining eBuff until Equation (4) is satisfied. If eBuff is too big, draining is behind, and the drain is set at the maximum rate until eBuff catches up. Consequently, some slack is needed.

The feedback loop resets xsBits after each picture is encoded, where xsBits represents the deviation from Equation (4):

$$x s\text{Bits}=v\text{Size}-e\text{Buff}[n]-m\text{Buff}[n]. \qquad (5)$$

Equation (5) represents xsBits as the excess number of bits removed from eBuff. If xsBits is non-zero; the metering logic of Equation (6) (shown below) will correct it, or at least keep it from growing. By frequently resetting xsBits, the feedback loop ensures that vBuff is always synchronized with the encoder's model, mBuff.

In this example, the metering logic queries the status of eBuff every millisecond, where the status is quantified by xsBits. The status is quantified by xsBits, which is defined as the excess bits removed from eBuff (see below). Then, each msec:

$$xs\text{Bits}+=\text{bits\_drained}-\text{video\_rate}\times T$$

$$\text{if } (xs\text{Bits}>0) \text{ turn off\_drain} \qquad (6)$$

$$\text{else turn\_on\_drain (if it is off)}$$

where:

T=time since last query (1 millisecond), bits_drained refers to bits removed from eBuff since the last query.

That is to say, when xsBits>0, transmission of bits is inhibited. Note that the notation "+=" is a C programming language notation; for example, "x+=y" means that the value of x is incremented by y.

Equation (2) assumes constant bit-rate encoding. The generalization of Equation (2) for variable bit-rate encoding yields:

$$v\text{Buff}(t+eeD)+e\text{Buff}(t)=\int_{t}^{t+eeD}\text{drain\_rate}(\tau)d\tau=\text{drainIntegral}, \qquad (7)$$

which stated another way yields:

$$v\text{Buff}(t+eeD)+e\text{Buff}(t)=\int_{t-eeD}^{t}\text{video\_rate}(\tau)d\tau=\text{drainIntegral}, \qquad (8)$$

where the resulting drainIntegral value is in units of bits.

Equation (3) still gives eeD, where video_rate is the rate at startup. Note that in Equation (8) it is assumed that:

$$\text{drain\_rate}(t+eeD)=\text{video\_rate}(t). \qquad (9)$$

One implication of Equation (9) is that eBuff must be large enough to hold the extra bits produced when we increase the coding rate many frames before increasing the drain_rate. This is not a problem, as long as the corresponding encoder buffer is large. In one example, a 16-Mbit buffer is employed. Even without imposing Equation (9), more buffering would be needed to keep eeD constant when the bit rate increases.

Equation (8) simplifies when eeD is a multiple of the frame period:

$$v\text{Buff}[n]+e\text{Buff}[n]=\sum_{k=n+1-eeD/f}^{n}\text{video\_rate}[k], \qquad (10)$$

where f is the frame period. However, eeD need not be an integer number of frames, and one implementation evaluates the drain integral by interpolation when eeD is not an integer. It also interpolates the drain_rate in Equation (9), because it is most convenient to change the drain_rate at picture boundaries.

Thus, for VBR, xsBits is determined as follows:

$$x s\text{Bits}=\text{drainIntegral}-e\text{Buff}-m\text{Buff}. \qquad (11)$$

Except for the need to generalize Equation (2), which generalizes Equation (5) to Equation (11), the feedback mechanism for CBR applies unchanged for VBR. Also, the metering logic of Equation (6) is unchanged. The feedback adjusts the drain_rate so that the BRC's model of vBuff, mBuff, is accurate. As indicated above, vBuff is inferred from the actual fullness of the encoder's buffer, eBuff.

B. Description of Preferred Embodiments

FIG. 1 shows, in simplified block diagram form, an MPEG-like encoder that may employ embodiments of the invention. Specifically shown is bandwidth allocator 101, which in one example, supplies a variable bit rate (VBR) for video encoding, video_rate. The encoding rate is supplied to MPEG-like encoder 103 and, therein, to bit rate controller (BRC) 104, video_rate integral unit 102 and xsBits unit 105. BRC 104 models the video decoder buffer 108, vBuff, to ensure its integrity. The BRC 104 tries to adjust the quantization so that mBuff, its model of vBuff, is never in danger of overflow or underflow. The bit content of mBuff, hereinafter mBuff, is supplied to xsBits unit 105. Encoder 103 also supplies eeD to video_rate integral unit 102. A uncompressed video signal to be encoded is also supplied to encoder 103. A compressed video signal is supplied from encoder 103 to encoder buffer 106, eBuff. The bit content of eBuff 106, hereinafter eBuff, is also supplied to xsBits unit 105. The compressed video signal is supplied from encoder buffer 106 via transmission control 107 for transmission to a remote hypothetical decoder 109 via hypothetical decoder buffer 108, vBuff. Video_rate integral unit 102 is responsive to video_rate and eeD to generate drainIntegral in accordance with Equation (8). Note that drainIntegral is in units of bits. xsBits unit 105 is responsive to video_rate, drainIntegral, the bit content of mBuff and the bit content of eBuff to generate, in accordance with equation (11), a control signal for controlling operation of transmission control 107. Thus, as such, xsBits unit 105 is a control signal generator. As indicated above, if xsBits exceeds a prescribed threshold, in this example, zero (0), transmission control 107 stops the transmission of bits from encoder buffer 106, i.e., eBuff, to a remote decoder 109 via decoder buffer 108. Also, as described above, decoder buffer (vBuff) 108 is a remote decoder buffer and decoder 109 is its associated remote decoder. Decoder 109 yields the desired uncompressed video signal at the remote location. Since vBuff is in a video decoder buffer 108 its bit content is not readily available. Thus, as described above, the bit content of vBuff is inferred through use of Equation (8).

In another application of the invention, a constant bit rate (CBR) encoding video_rate signal from start up is supplied from bandwidth allocator 101 to video_rate integral unit 102, to encoder 103 and, therein, to bit rate controller 104, and to xsBits unit 105. When xsBits is not greater than zero, bits are allowed be transmitted from encoder buffer 106 to the remote decoder 109 via decoder buffer 108. Video_rate integral unit 102 operates in accordance with Equation (2), to generate drainIntegral that is supplied to xsBits unit 105. In this example, drainIntegral evaluates to vSize. xsBits unit 105 is responsive to video_rate, drainIntegral, mBuff from BRC 104 and eBuff from encoder buffer 106 to generate a control signal to effect the results of Equation (6). Thus, when xsBits>0, the control signal from xsBits unit 105 is supplied to transmission control 107 to stop transmission of bits from encoder buffer 106 to a decoder 109 at a remote location. When xsBits does not exceed zero, bits are allowed be transmitted from encoder buffer 106 to the remote decoder 109.

The above-described embodiments are, of course, merely illustrative of the principles of the invention. Indeed, a number other arrangements may be devised by those skilled in the art without departing from the spirit and scope of the invention. For example, embodiments of the invention may be implemented in hardware or in software in a digital signal processor or the like.

What is claimed is:

1. Apparatus for use in an encoder to ensure integrity of a hypothetical decoder buffer of a video buffer verifier comprising:

a source of a video encoding bit rate;

an encoder buffer including a second bit content;

a video encoder having a bit rate controller including a model buffer having a first bit content, said model buffer being representative of said hypothetical decoder buffer and said first bit content of said model buffer being representative of an inferred bit content of said hypothetical decoder buffer, said video encoder having a variable encoding bit rate and generates a representation of a delay interval between encoding a video frame and decoding said video frame;

a transmission controller responsive to a control signal for controllably inhibiting transmission of bits from said encoder buffer; and a control signal generator for generating said control signal in accordance with a prescribed relationship dependent on said video encoding bit rate, said first bit content and said second bit content for generating said control signal, said control signal generator including a first generator which is response to said variable video encoding bit rate and said delay interval for generating a representation of a number of bits drained from said encoder buffer during a prescribed interval and an excess bits generator responsive said instantaneous video encoding bit rate, said representation of bits drained, said first bit content and said second bit content to generate said control signal, and said representation of bits drained being determined in accordance with $$\int_{t-eeD}^{t} \text{video\_rate}(\tau)\,d\tau = drainIntegral,$$

where video rate($\tau$) is the instantaneous video encoding bit rate, eeD in said delay interval and drainIntegral is the representation of bits drained.

2. The invention as defined in claim 1 wherein said excess bits generator generates said control signal in accordance with a second prescribed relationship of said drainIntegral, said first bit content and said second bit content.

3. The invention as defined in claim 2 wherein said second prescribed relationship is in accordance with xsBits= drainIntegral−eBuff−mBuff, wherein mBuff is said first bit content and eBuff is said second bit content.

4. A method for use in an encoder to ensure integrity of a hypothetical decoder buffer of a video buffer verifier comprising the steps of:

supplying a variable video encoding bit rate;

maintaining a model buffer including a first bit content;

said model buffer being representative of said hypothetical decoder buffer and said first bit content of said model buffer being representative of an inferred bit content of said hypothetical decoder buffer;

maintaining an encoder buffer including a second bit content;

in response to a control signal, controllably inhibiting transmission of bits from said encoder buffere;

generating said control signal in accordance with a prescribed relationship dependent on said variable video encoding bit rate, said first bit content and said second bit content for generating said control signal;

generating a representation of a delay interval between encoding a video frame and decoding said video frame;

in response to said variable video encoding bit rate and said delay interval, generating a representation of a number of bits drained from said encoder buffer during a prescribed interval and in responsive to said instantaneous encoding video rate, said representation of bits drained, said first bit content and said second bit content, generating said control signal;

said step of generating said representation of bits drained includes a step of employing;

$$\int_{t-eeD}^{t} \text{video\_rate}(\tau)\,d\tau = drainIntegral,$$

where video rate is the instantaneous encoding video bit rate, eeD in said delay interval and drainIntegral is the representation of bits drained.

5. The method as defined in claim 4 wherein said step of generating said excess bits includes a step of generating said control signal in accordance with a second prescribed relationship of said drainIntegral, said first bit content and said second bit content.

6. The method as defined in claim 5 wherein said second prescribed relationship is in accordance with xsBits= drainIntegral−eBuff−mBuff, wherein mBuff is said first bit content and eBuff is said second bit content.

7. Apparatus for use in an encoder to ensure integrity of a hypothetical decoder buffer of a video buffer verifier comprising:

a source of a substantially constant video encoding bit rate;

an encoder buffer including a second bit content;

a video encoder having a bit rate controller including a model buffer having a first bit content, said model buffer being representative of said hypothetical decoder buffer and said first bit content of said model buffer being representative of an inferred bit content of said hypothetical decoder buffer, said video encoder having a substantially constant encoding bit rate and generates a representation of a delay interval between encoding a video frame and decoding said video frame;

a transmission controller responsive to a control signal for controllably inhibiting transmission of bits from said encoder buffer; and a control signal generator for generating said control signal in accordance with a prescribed relationship dependent on said video encoding bit rate, said first bit content and said second bit content for generating said control signal, said control signal generator being responsive to said video substantially constant encoding bit rate, said first bit content, said second bit content and said delay interval to generate said control signal in accordance with said prescribed relationship during prescribed intervals that a predetermined relationship exists between bits drained from said encoder buffer and bits supplied to said encoder buffer, said control signal being generated during said prescribed intervals that the number of bits drained from said encoder buffer is greater than the number of bits supplied to said encoder buffer, and said prescribed relationship being in accordance with xsBits being incremented by bits_drained−video_rate×T, and said control signal being generated when xsBits>0, wherein T is a prescribed interval, bits_drained is the number of bits drained from said video buffer during interval T, video_rate is the video encoding bit rate, and video_rate×T is the number of bits supplied to said video buffer during interval T.

8. The invention as defined in claim 7 wherein said bits_drained is a number of bits transmitted from said encoder buffer during said interval T.

9. A method for use in an encoder to ensure integrity of a hypothetical decoder buffer of a video buffer verifier comprising the steps of:

supplying a substantially constant video encoding bit rate;

maintaining a model buffer including a first bit content, said model buffer being representative of said hypothetical decoder buffer and said first bit content of said model buffer being representative of an inferred bit content of said hypothetical decoder buffer;

maintaining an encoder buffer including a second bit content;

in response to a control signal, controllably inhibiting transmission of bits from said encoder buffer; generating said control signal in accordance with a prescribed relationship dependent on said variable video encoding bit rate, said first bit content and said second bit content for generating said control signal; and generating a representation of a delay interval between encoding a video frame and decoding said video frame;

said step of generating said control signal utilizes said substantially constant video encoding bit rate, said first bit content, said second bit content and said delay interval to generate said control signal in accordance with said prescribed relationship during prescribed intervals that a predetermined relationship exists between bits drained from said encoder buffer and bits supplied to said encoder buffer, and generates said control signal during said prescribed intervals that the number of bits drained from said encoder buffer is greater than the number of bits supplied to said encoder buffer, and said prescribed relationship is in accordance with xsBits being incremented by bits_drained−video_rate×T, and said control signal is generated when xsBits>0, wherein T is a prescribed interval, bits_drained is the number of bits drained from said video buffer during interval T, video_rate is the video encoding bit rate, and video_rate×T is the number of bits supplied to said video buffer during interval T.

10. The method as defined in claim 9 further including determining said bits_drained in accordance with a number of bits transmitted from said encoder buffer during said interval T.

* * * * *